(12) United States Patent
Kang et al.

(10) Patent No.: US 10,564,878 B2
(45) Date of Patent: Feb. 18, 2020

(54) PROCESSING A WRITE REQUEST USING A REDUNDANT ARRAY OF INDEPENDENT DISKS (RAID)

(71) Applicant: EMC IP Holding Company LLC, Hopkinton, MA (US)

(72) Inventors: Jamin Jianbin Kang, Beijing (CN); Liam Xiongcheng Li, Beijing (CN); Jian Gao, Beijing (CN); Geng Han, Beijing (CN); Xinlei Xu, Beijing (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 16/021,673

(22) Filed: Jun. 28, 2018

(65) Prior Publication Data

US 2019/0056866 A1   Feb. 21, 2019

(30) Foreign Application Priority Data

Jun. 30, 2017 (CN) .......................... 2017 1 0524932

(51) Int. Cl.
*G06F 3/06* (2006.01)

(52) U.S. Cl.
CPC .............. *G06F 3/064* (2013.01); *G06F 3/061* (2013.01); *G06F 3/0604* (2013.01); *G06F 3/0689* (2013.01)

(58) Field of Classification Search
CPC ........ G06F 3/0604; G06F 3/061; G06F 3/064; G06F 3/0689
See application file for complete search history.

(56) References Cited

U.S. PATENT DOCUMENTS

| | | | |
|---|---|---|---|
| 6,223,243 B1 * | 4/2001 | Ueda | G06F 3/061 709/240 |
| 9,594,513 B1 | 3/2017 | Delgado et al. | |
| 9,612,754 B1 | 4/2017 | Delgado et al. | |
| 9,612,756 B1 | 4/2017 | Koli et al. | |
| 9,804,939 B1 | 10/2017 | Bono et al. | |
| 9,934,172 B1 | 4/2018 | Koli et al. | |
| 10,037,289 B1 | 7/2018 | Koli et al. | |
| 10,146,447 B1 | 12/2018 | Dong et al. | |
| 10,235,286 B1 | 3/2019 | Yu et al. | |
| 10,353,588 B1 | 7/2019 | Koli et al. | |
| 10,365,983 B1 | 7/2019 | Foley et al. | |
| 2003/0041211 A1 * | 2/2003 | Merkey | G06F 11/1076 711/114 |

* cited by examiner

*Primary Examiner* — Aracelis Ruiz
(74) *Attorney, Agent, or Firm* — BainwoodHuang

(57) ABSTRACT

Implementations of the subject matter described herein provide a storage management method and system. The storage management method comprises: in response to receiving a write request, dividing data to be written into a plurality of data blocks with a predetermined size, the plurality of data blocks having their respective logic block addresses; evenly mapping, based on the logic block addresses, the plurality of data blocks to a plurality of RAID extents of a Redundant Array of Independent Disks (RAID); mapping the plurality of data blocks in the plurality of RAID extents to the disk, so that the plurality of data blocks are distributed in order of size of logic block addresses in the disk.

12 Claims, 7 Drawing Sheets

PROCESSING A WRITE REQUEST USING A REDUNDANT ARRAY OF INDEPENDENT DISKS (RAID)

RELATED APPLICATIONS

This application claim priority from Chinese Patent Application Number CN 201710524932.X, filed on Jun. 30, 2017 at the State Intellectual Property Office, China, titled "STORAGE MANAGEMENT METHOD AND SYSTEMS" the contents of which is herein incorporated by reference in its entirety.

FIELD

The present disclosure relates to storage management and optimization. More specifically, the present disclosure relates to a storage management method and system, a computer-readable storage medium and a computer program product.

BACKGROUND

To better manage and optimize storage, a conventional computer system usually pools several disk partitions as a storage pool, then builds a Redundant Array of Independent Disks (RAID) on the storage pool, and performs linear logical block address (LBA) mapping between RAID extents and logical units (LUN) through a RAID mapping table (RMT), thereby implementing mapping the user's I/O data to the disk.

The above linear mapping manner has advantages such as simple algorithm. However, since the user's I/O after the linear mapping usually only concentrates in partial RAID extents and cannot be evenly distributed on the whole disk space, the heat generation of the storage device is uneven, and the I/O performance of the whole storage device is substantially reduced, and particularly the I/P per second (IOPS) performance is remarkably reduced.

SUMMARY

The subject matter described herein provides a storage management method and system, which can optimize the I/O performance of the storage system.

According to a first aspect of the present disclosure, there is provided a storage management method. The method comprises: in response to receiving a write request, dividing data to be written into a plurality of data blocks with a predetermined size, the plurality of data blocks having their respective logic block addresses; evenly mapping, based on the logic block addresses, the plurality of data blocks to a plurality of RAID extents of a Redundant Array of Independent Disks (RAID); mapping the plurality of data blocks in the plurality of RAID extents to the disk, so that the plurality of data blocks are distributed in order of size of logic block addresses in the disk.

According to a second aspect of the present disclosure, there is provided a storage management method. The method comprises: in response to receiving an I/O request for a plurality of data blocks, determining, based on respective logic block addresses of the plurality of data blocks, position information of the plurality of data blocks which are evenly mapped to the plurality of RAID extents of the RAID; determining, based on the position information about mapping to the RAID extent, position information of the plurality of data blocks which are mapped to the disk, so that the plurality of data blocks are distributed in order of size the logic block addresses in the disk; reading/writing, based on the position information of the plurality of data blocks in the disk, the plurality of data blocks.

According to a third aspect of the present disclosure, there is provided a storage management system. The system comprises: a storage unit configured to store one or more programs; a processing unit coupled to the storage unit and configured to execute one or more programs to cause the apparatus to perform multiple acts, the acts comprising: in response to receiving a write request, dividing data to be written into a plurality of data blocks with a predetermined size, the plurality of data blocks having their respective logic block addresses; evenly mapping, based on the logic block addresses; mapping the plurality of data blocks in the plurality of RAID extents to the disk, the plurality of data blocks to a plurality of RAID extents of a Redundant Array of Independent Disks (RAID), so that the plurality of data blocks are distributed in order of size of logic block addresses in the disk.

According to a fourth aspect of the present disclosure, there is provided a storage management system. The system comprises: a storage unit configured to store one or more programs; a processing unit coupled to the storage unit and configured to execute one or more programs to cause the apparatus to perform multiple acts, the acts comprising: in response to receiving an I/O request for a plurality of data blocks, determining, based on respective logic block addresses of the plurality of data blocks, position information of the plurality of data blocks evenly which are mapped to the plurality of RAID extents of the RAID; determining, based on the position information about mapping to the RAID extent, position information of the plurality of data blocks mapped to the disk, so that the plurality of data blocks are distributed in order of size the logic block addresses in the disk; reading/writing, based on the position information of the plurality of data blocks in the disk the plurality of data blocks.

According to a fifth aspect of the present disclosure, there is provided a computer-readable storage medium. Computer program instructions are stored on the computer readable storage medium. The computer program instructions, when executed by a processing unit, perform the method according to the first aspect or the second aspect.

According to a sixth aspect of the present disclosure, there is provided a computer program product. The computer program product is tangibly stored on a non-transient computer readable medium and includes machine executable instructions, the machine executable instructions, when being executed, causing a machine to perform steps of the method according to the first aspect or second aspect.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

The above and other objects, features and advantages of the present disclosure will be made more apparent by describing exemplary embodiments of the present disclosure in more detail with reference to figures, wherein identical reference signs represent identical parts in the exemplary embodiments of the present disclosure.

DETAILED DESCRIPTION

Preferred embodiments of the present disclosure will be described in more detail with reference to figures. Although the figures show preferred embodiments of the present disclosure, it should be appreciated that the present disclosure may be implemented in various forms and should not be limited by embodiments described here. On the contrary, these embodiments are provided to make the present disclosure more transparent and complete and convey the scope of the present disclosure completely to those skilled in the art.

As used herein, the term "includes" and its variants are to be read as open terms that mean "includes, but is not limited to." The term "based on" is to be read as "based at least in part on." The term "one implementation" and "an implementation" are to be read as "at least one implementation." The term "another implementation" is to be read as "at least one other implementation." The terms "first," "second," and the like may refer to different or same objects. Other definitions, explicit and implicit, may be included below.

As stated above, a conventional method of controlling a storage device of a computer system is implemented by building a linear LBA mapping between RAID extents and LUNs, thereby implementing mapping the user's I/O data to the disk. It is found after research that the above linear mapping method has drawbacks in the following aspects: in one aspect, after the linear mapping, the user's I/O is not evenly distributed in the storage space of the whole disk, but concentrates on some RAID extents, so that the locality where the I/O concentrates will overheat. Furthermore, as the user's I/O concentration area changes, the overheat area of the disk changes and then heat generation of the whole storage device gets uneven, which does not facilitate the service life of the storage device and purposefulness of heat dissipating measures. In the second aspect, a cache layer on the LUN converts random user I/O into sequential I/O, and maps the sequential I/O to RAID extents. Since the user I/O after linear mapping only concentrates on partial RAID extents and other RAID extents configured in the system are in an idle state and are not used sufficiently, the whole I/O performance of the system drops, and particularly the performance of IOPS is caused to substantially fall.

Figure 1:
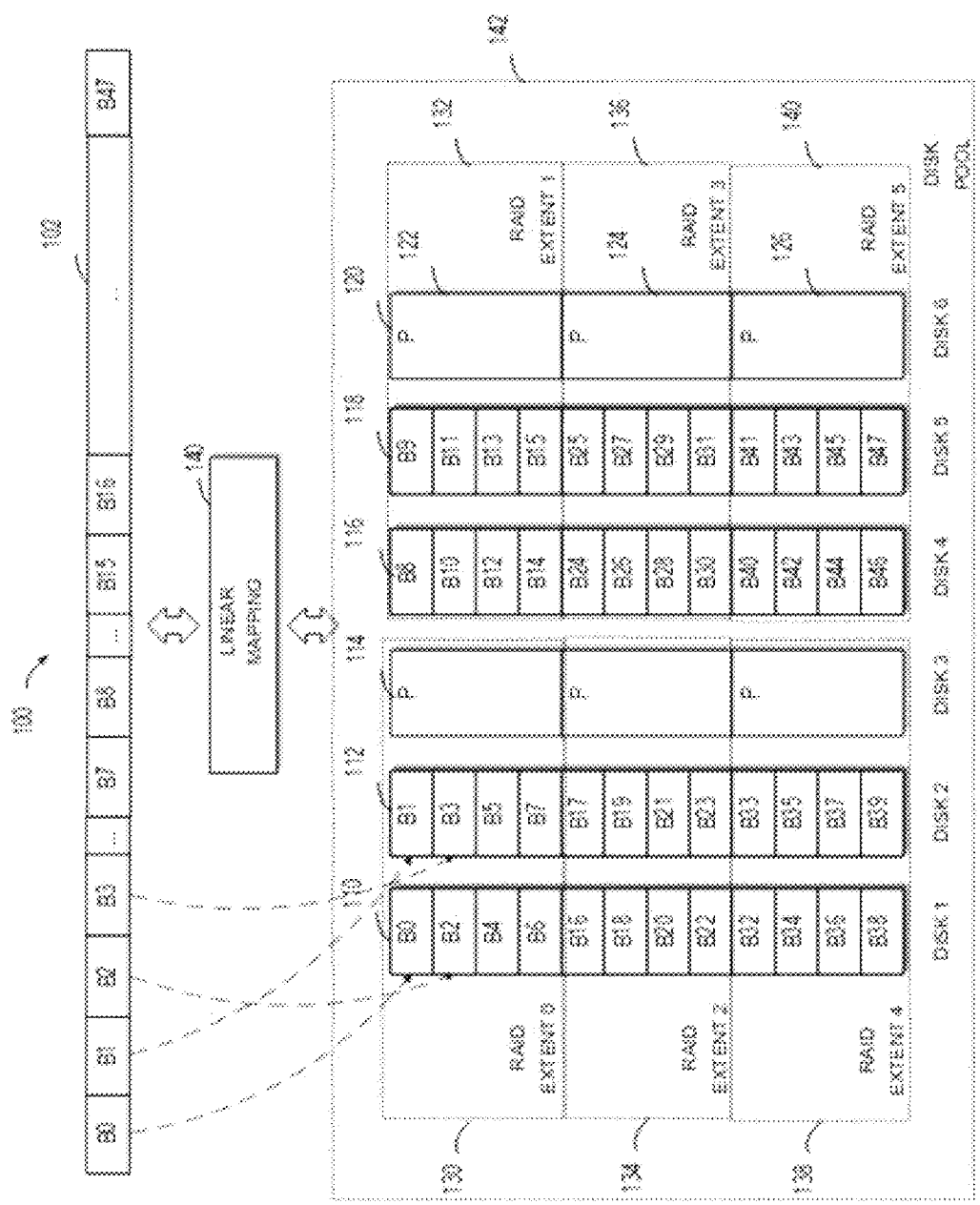
FIG. 1 illustrates a schematic diagram of architecture of a conventional storage management system 100.

For example, FIG. 1 illustrates a diagram of architecture of a conventional storage device 100 based on linear mapping. As shown in the figure, the storage device 100 comprises six disks 110, 112, 114, 116, 118 and 120, each disk including three disk extents, for example, disk 120 comprises three disk extents 122, 124 and 126. The six disks 110-120 are pooled into a storage pool. A logic RAID is built on the storage pool. The RAID is divided into a plurality of RAID extents. As shown in FIG. 1, the B0-B47 on 110-120 show real positions of data blocks on the disk after linear mapping 140. If a user accesses data blocks B0-B3, the system only uses partial disk extents of three disks 110-114 which are involved by the first RAID extent 130, as indicated by dotted-line arrows. Since data only concentrates on partial disk extents of the disks 110-114, the partial disk extents of the system are caused to overheat. In addition, since the remaining most disk extents are completely idle, the I/O capability of six disks originally configured in the system, particularly the overall IOPS capability is not sufficiently used, and therefore the I/O performance of the whole system is reduced, particularly the IOPS performance is substantially reduced.

It can be seen that the linear mapping 140 is advantageous in simple algorithm. However, it is discovered by using different I/O modes to research and test that the storage management method based on linear mapping cannot solve the above two problems of the whole storage systems, namely, uneven heat generation and reduction of the whole I/O performance of the system.

To at least partially solve the above problems and one or more of other potential problems, example embodiments of the present disclosure provides a storage management method. Through logical unit mapping between the logical units (LUN) and RAID extents, a plurality of data blocks with respective logic block addresses in the logic units are evenly mapped to a plurality of RAID extents of the RAID, preferably to all RAID extents; and through the block mapping between the RAID extents and disk extents, a plurality of data blocks in the plurality of RAID extents are mapped to the plurality of disk extents, so that the plurality of data blocks are distributed in the disk in order of size of the logic block addresses. According to the scheme, since the data blocks in the logic units (LUN) are evenly mapped to all RAID extents through logic unit mapping, this avoids the problem that data blocks to which the I/O request is directed only concentrate on individual RAID extents which causes overheat of partial disk extents as well as uneven heat generation of the whole storage system. Meanwhile, the data blocks are mapped to a plurality of disk and thereby invokes the I/O capability of a plurality of disk even all disks, the I/O performance of the whole storage system is improved. In addition, through the block mapping between the RAID extends and disk extents, the data blocks on the disk are distributed in order of size of LBAs in the logic unit LUN so that the I/O on the disk is continuous, thereby avoiding the unfavorable aspect of frequently change of channels of a magnetic head due to a larger distribution span of the I/O data on the disk, and therefore improving the data read/write efficiency of the storage system.

Figure 2:
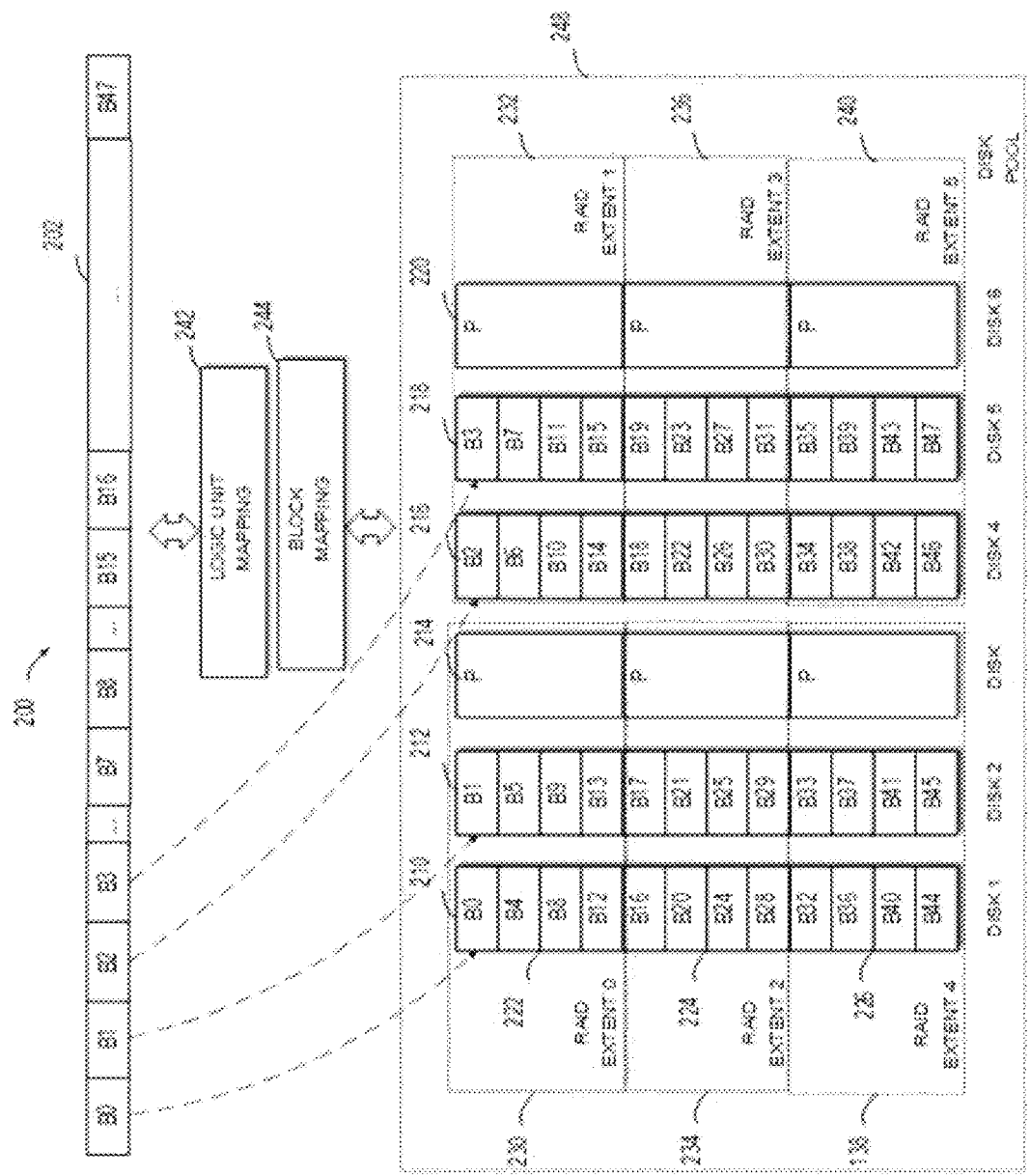
FIG. 2 illustrates a schematic diagram of architecture of a storage management system 200 according to an implementation of the subject matter described herein.

FIG. 2 illustrates a schematic diagram of a storage management system 200 according to an implementation of the subject matter described herein. As shown in FIG. 2, the storage management system 200 comprises a plurality of disks, for example, six disks 210-220, each disk including a plurality of disk extents, for example, disk 220 including three disk extents 222-226. A plurality of, for example six disks 110-120 are pooled into a storage pool 248. A RAID is built on the storage pool. The RAID is divided into a plurality of RAID extents, for example six RAID extents, namely, RAID extents 0-5. B0-B47 (47 is only an illustrative figure) represent data blocks in the logic unit LUN202. Through a logic unit mapping 242, a plurality of continuous data blocks on the LUN are evenly mapped to a plurality of RAID extents, and then through a block mapping 244, the data blocks on the RAID extents are mapped to disk extents (not specifically shown in FIG. 2), so that the data blocks are distributed in order of size of logic blocks in each disk, for example, data blocks B0, B4, B8, B12, B16 . . . B44 distributed in disk 1. These data blocks with a small logic block address in the LUN has a small address actually distributed in disk 1. As shown in FIG. 2, B0-B47 on disks 210-220 show real positions of data blocks on the disk after the logic unit mapping 242 and the block mapping 244. If the user sequentially accesses the data blocks B0-B47 in LUN102, I/O sequentially accesses B0-B47 on the disk. FIG. 2 does not specifically show mappings in parity disks. They should have the same mapping as data disks 1, 2, 4 and 5. FIG. 2 is only illustrative, for example, each disk extent only has four data blocks in FIG. 2, whereas each disk extent may have more than 1000 data blocks in actual disk hardware. For example, if the size of the disk extent is 16 GB, and the size of each data block is 4 MB, each disk extent includes 2500 data blocks.

Figure 3:
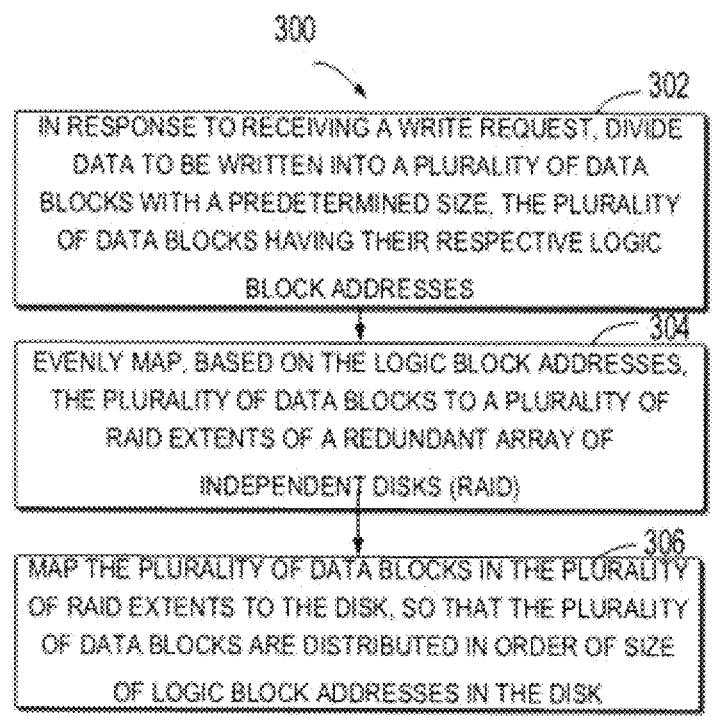
FIG. 3 illustrates a flow chart of a storage management method 300 according to an implementation of the subject matter described herein.

FIG. 3 illustrates a schematic diagram of a storage management method 300 according to an implementation of the subject matter described herein. In FIG. 3, actions for example are executed by a controller. The method 300 may further comprise additional actions not shown and/or shown actions may be omitted. The scope of the present disclosure is not limited in this aspect.

At block 302, in response to receiving a write request, data to be written are divided into a plurality of data blocks with a predetermined size, the plurality of data blocks having their respective logic block addresses. In some embodiments, in response to receiving the user's write request, a file system maps data to be written to an associated logic unit LUN, and logic block addresses or data block indexes of the plurality of data blocks in the associated LUN are continuous. In some embodiments, the size of the data block needs to be small enough to ensure that the data to be written may be divided into sufficient data blocks for be distributed to a plurality of disks, preferably to all disks. In some embodiments, the size of the data blocks is 1 M-64 MB, and may achieve a better performance.

At block 304, the plurality of data blocks are evenly mapped to a plurality of RAID extents of the RAID based on the logic block addresses. A manner of evenly mapping the plurality of data blocks to the plurality of RAID extents of the RAID, namely, a logic unit mapping manner, may be built based on multiple algorithms. The evenly mapping here is not only limited to absolute even, substantially even mapping is feasible because in many cases, the number of data blocks is not an integer times the number of RAID extents. In some embodiments, it is feasible to, based on an index of each data block in the plurality of data blocks in a relevant logic unit LUN and the number of RAID extents, determine position information of the data blocks which are mapped to the RAID extent.

In some embodiments, for example, a sequence number of the data block mapped to the RAID extent is determined based on a reminder obtained by dividing the index of the data block in the relevant logic unit LUN by the number of RAID extents; an internal offset of the data block mapped to the RAID extent is determined based on a quotient obtained by dividing the index by the number of RAID extents. That is, it is feasible to perform logic unit mapping with the following algorithm, namely, determine position information of the data block mapped to the RAID extent:

$$R_{index} = B_{index}/N$$

$$R_{offset} = B_{index} \% N$$

wherein Bindex represents the index of the data block in the logic unit, N represents the number of RAID extents, Rindex represents a sequence number of the data block which is sent to the RAID extent, and Roffset represents an internal offset of the data block sent to the RAID extent. The meaning of the above formula is: determine the sequence number Rindex of the data block mapped to the RAID extent based on the remainder obtained by dividing the index Bindex of the data block in the logic unit by the number N of the RAID extents; and determine, based on a quotient obtained by dividing the index Bindex of the data block in the logic unit by the number N of the RAID extents, the internal offset Roffset of the data block mapped to the RAID extent. For example, if the index Bindex of the data block B11 in the logic unit is 11, and the number N of RAID extents is for example 6, the data block 11 is mapped to the second data block of the RAID extent of the RAID extent 5 based on the logic unit mapping.

In some embodiments, the logic unit mapping may also be built based on the following formula, i.e., the position information of the plurality of data blocks evenly mapped to the plurality of RAID extents is determined by the following formula.

$$R_{index} = B_{index} \times (N-1)/N$$

$$R_{offset} = B_{index} \times (N-1) \% N$$

It is also feasible to evenly map the plurality of data blocks to the plurality of RAID extents of the RAID by other algorithms.

Figure 6:
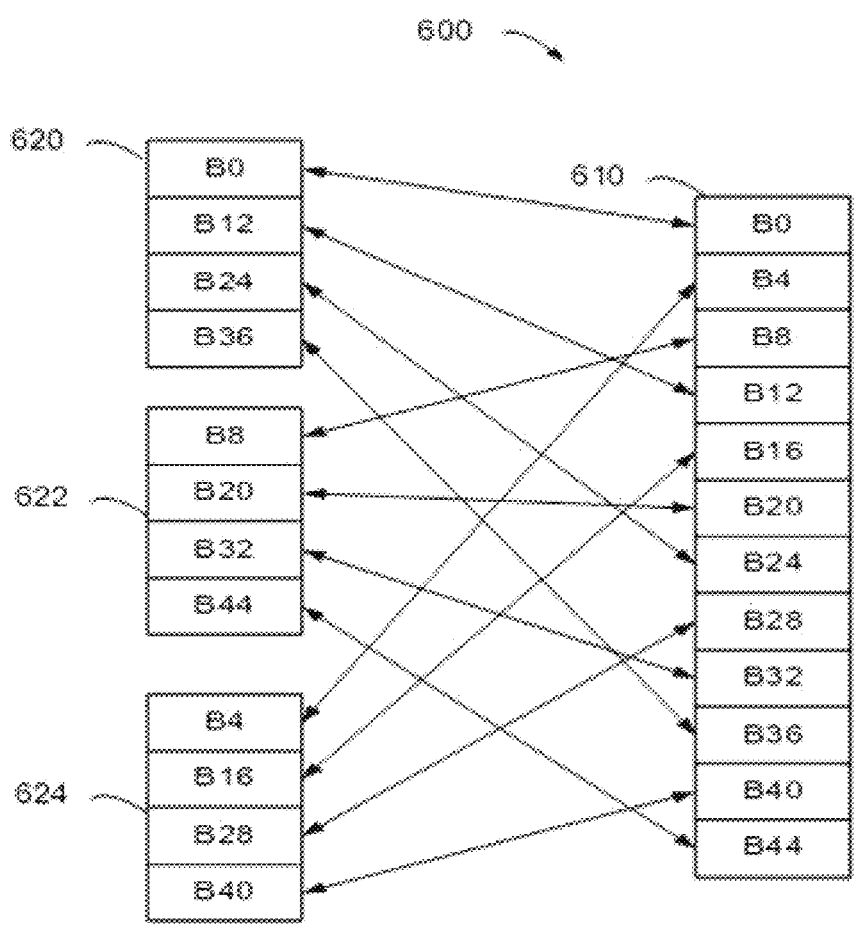
FIG. 6 illustrates a schematic diagram of block mapping according to another implementation of the subject matter described herein.

At block 306, the plurality of data blocks in the plurality of RAID extents are mapped to the disk, so that the plurality of data blocks are distributed in order of size of logic block addresses in the disk. A manner of mapping the plurality of data blocks in the plurality of RAID extents to the disk, namely, a block mapping manner, may be built based on multiple algorithms. In some embodiments, the internal offset of the data block mapped to the disk may be determined based on the number of disk extents included by the disk, the number of data blocks included by the disk extents and the index of the data block in a relevant logic unit. In some embodiments, the following algorithm may be employed to perform logic unit mapping, namely, determine the position information of the data block which is mapped to the RAID extent:

$$B_t = (B_s \% M) \times P + (B_s/M) \% P$$

wherein P represents the number of disk extents included by each disk, M represents the number of data blocks included by each disk extent, Bs represents an index of the data block in the logic unit before the mapping, and Bt represents the internal offset of the data block sent into the disk. FIG. 6 illustrates a schematic diagram of block mapping 600 according to another implementation of the subject matter described herein. For example, as shown in FIG. 6, each disk includes three disk extents, for example 610 represents disk 1 including three disk extents, each disk extent includes four data blocks, namely, M is 4 and P is 3. In addition, 620 represents RAID extent 0, 622 represents RAID extent 2, and 624 represents RAID extent 4. The block mapping 600 built based on the above formula maps the plurality of data blocks in the plurality of RAID extents into the disk, so that the plurality of data blocks are distributed in order of size of the logic block address in the disk. For example, the data block B8 in the RAID extent 2 is mapped through block mapping to obtain its internal offset value position in the disk 1 is 3.

In some embodiments, the block mapping may be built based on the following formula, namely, the position information of the plurality of data blocks mapped to the disk is determined through the following formula.

$$B_t = ((B_s+k)\% M) \times P + ((B_s+k)/M)\% P$$

In the above formula, P represents the number of disk extents included by each disk, M represents the number of data block included by each disk extent, Bs represents an index of the data block in the logic unit, and Bt represents the internal offset of the data block sent into the disk. K represents a natural number, for example but not limited to a number selected from 1-10.

Through the storage management method shown in FIG. 3, the plurality of data blocks are distributed in order of size of the logic block addresses in the disk, so that the write operation for the data block is relatively continuous. As well known, IOPS is an important index for measuring the performance of the storage system. Usually time used by one I/O is equal to the sum of seek time and data transmission time. Since the seek time is usually larger than the data transmission time by several orders of magnitude, a key factor affecting the IOPS is the seek time. In the case of continuous I/O, the seek time is usually very short. Therefore, according to the storage management method 300 of the present disclosure, the plurality of data blocks are distributed in order of size of the logic block addresses in the disk, so that the write operation for the data block is relatively continuous. Hence, this facilitates reduction of the seek time and improvement of the performance of IOPS.

Figure 4:
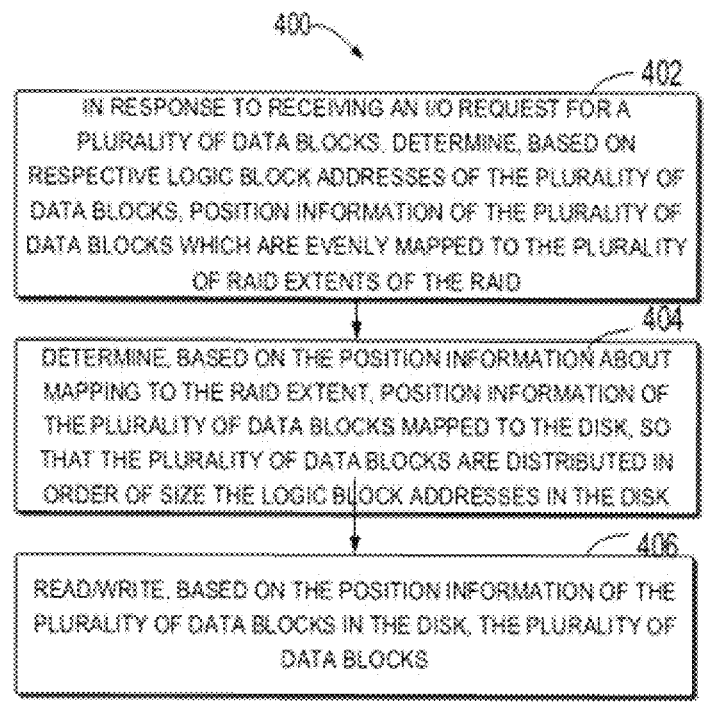
FIG. 4 illustrates a flow chart of a storage management method 400 according to another implementation of the subject matter described herein.

FIG. 4 illustrates a flow chart of a storage management method 400 according to another implementation of the subject matter described herein. In FIG. 4, actions for example are executed by a controller. The method 400 may further comprise additional actions not shown and/or shown actions may be omitted. The scope of the present disclosure is not limited in this aspect.

At block 402, in response to receiving an I/O request for a plurality of data blocks, position information of the plurality of data blocks evenly mapped to the plurality of RAID extent of the RAID is determined based on respective logic block addresses of the plurality of data blocks. In some embodiments, the number of the data blocks with respect to which the I/O request is filed is at least larger than or equal to the number of RAID extents, so that the plurality of continuous data blocks in the logic unit can be evenly mapped to the number of RAID extents, such that the plurality of data blocks with respect to which the I/O request is filed are evenly distributed on all disks, and therefore the storage system obtains an optimal I/O per second performance and heat generation balance. For example, regarding storage management of a large-sized cluster system of an enterprise, the storage management system simultaneously receives hundreds of or tens of thousands of I/O requests or receives I/O requests involving larger access data quantity, and these I/O requests usually involve access to continuous multiple data blocks. Logical block addresses or data block indexes of these continuous multiple data blocks in the associated LUN are also continuous. For example, B0-B16 in LUN202 in FIG. 2.

A manner of determining the position information of the plurality of data blocks evenly mapped to the plurality of RAID extents, namely, a logic unit mapping manner, may be built based on multiple algorithms. In some embodiments, it is feasible to, based on an index of each data block in the plurality of data blocks in a relevant logic unit LUN and the number of RAID extents, determine position information of the data block mapped to the RAID extent. In some embodiment, for example, a sequence number of the data block mapped to the RAID extent is determined based on a reminder resulting from dividing the index of the data block in the relevant logic unit LUN by the number of RAID extents; an internal offset of the data block sent to the RAID extent is determined based on a quotient obtained by dividing the index by the number of RAID extents. That is, it is feasible to perform logic unit mapping with the following algorithm, namely, determine position information of the data block mapped to the RAID extent:

$$R_{index} = B_{index}/N$$

$$R_{offset} = B_{index}\% N$$

wherein Bindex represents the index of the data block in the logic unit, N represents the number of RAID extents, Rindex represents a sequence number of the data block sent to the RAID extent, and Roffset represents an internal offset of the data block sent to the RAID extent. In some embodiments, the logic unit mapping is built based on the following formula, i.e., the position information of the plurality of data blocks evenly mapped to the plurality of RAID extents is determined by the following formula.

$$R_{index} = B_{index} \times (N-1)/N$$

$$R_{offset} = B_{index} \times (N-1)\% N$$

In some embodiments, the logic unit mapping is built based on the following formula, i.e., the position information of the plurality of data blocks evenly mapped to the plurality of RAID extents is determined by the following formula.

$$R_{index} = (B_{index}+M)/N$$

$$R_{offset} = (B_{index}+M)\% N$$

In the above two formula, Bindex represents the index of the data block in the logic unit, N represents the number of RAID extents, Rindex represents a sequence number of the data block sent to the RAID extent, Roffset represents an internal offset of the data block sent to the RAID extent, and M represents a natural number, for example but not limited to a number selected from 1-10. The position information of the plurality of data blocks mapped to the plurality of RAID extents may be determined through multiple algorithms so long as they can implement evenly mapping the plurality of data blocks in the logic unit to the plurality of RAID extents of the RAID.

At block 404, the position information of the plurality of data blocks mapped to the disk is determined based on the position information about mapping to the RAID extent, so that the plurality of data blocks are distributed in order of size the logic block addresses in the disk. A manner of determining the position information of the plurality of data blocks mapped to the disk, namely, a block mapping manner may be built based on multiple algorithms. In some embodiments, the internal offset of the data block mapped to the disk may be determined based on the number of disk extents included by the disk, the number of data blocks included by the disk extents and the index of the data block in a relevant logic unit. In some embodiments, the following algorithm may be employed to perform logic unit mapping, namely, determine the position information of the data block mapped to the RAID extent:

$$B_t=(B_s\% \; M)\times P+(B_s/M)\% \; P$$

wherein P represents the number of disk extents included by each disk, M represents the number of data blocks included by each disk extent, Bs represents an index of the data block in the logic unit, and Bt represents the internal offset of the data block sent into the disk.

In some embodiments, the block mapping may be built based on the following formula, namely, the position information of the plurality of data blocks mapped to the disk is determined through the following formula.

$$B_t=(B_s^{M-1}\% \; M)\times P+(B_s^{M-1}+k)/M)\% \; P$$

In the above formula, P represents the number of disk extents included by each disk, M represents the number of data block included by each disk extent, Bs represents an index of the data block in the logic unit, and Bt represents the internal offset of the data block sent into the disk. K represents a natural number. The two-level mapping in the present disclosure may be calculated through formula and does not require more memory for storage.

At block 406, the plurality of data blocks are read/written based on the position information of the plurality of data blocks in the disk. Through the two-level mapping involved in blocks 402 and 404, the plurality of data blocks with respect to which the I/O request is filed are not only evenly distributed on a plurality of disks, and the data blocks on each disk are also sequentially distributed, so that the storage system does not have an idle disk and the heat generation is even; Furthermore, the I/O operation for the data block is also relatively continuous, so this facilitates reduction of the seek time and improvement of the performance of IOPS.

Figure 5:
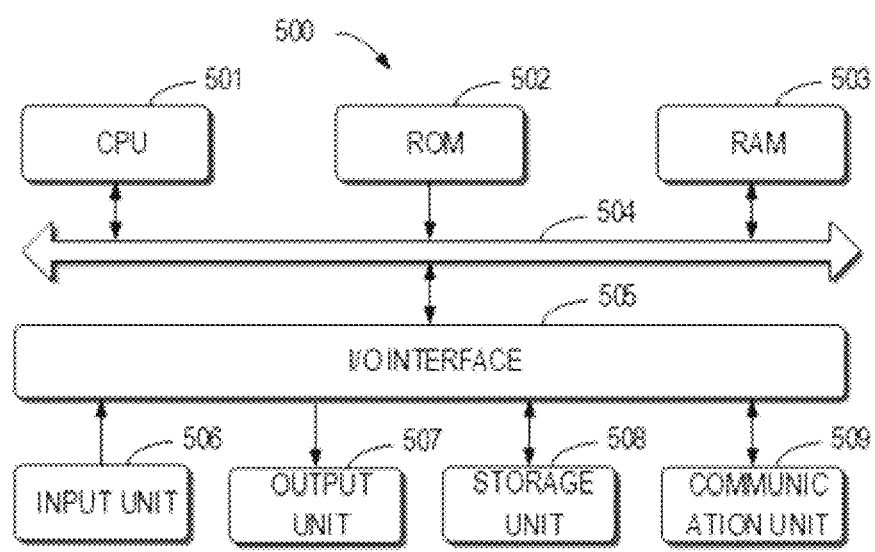
FIG. 5 illustrates a block diagram of an electronic device 500 adapted to implement an implementation of the subject matter described herein.

FIG. 5 illustrates a block diagram of an electronic device 500 adapted to implement an implementation of the subject matter described herein. The device 500 may be used to implement the storage management system of FIG. 2. As shown in FIG. 5, the device 500 comprises a central processing unit (CPU) 501 which is capable of performing various actions and processes in accordance with a computer program instruction stored in a read only memory (ROM) 502 or a computer program instruction loaded from a storage unit 508 to a random access memory (RAM) 503. In the RAM 503 are stored various programs and data as required by operation of the device 500. The CPU 501, the ROM 502 and the RAM 503 are connected to one another via a bus 504. An input/output (I/O) interface 505 is also connected to the bus 504.

The following components of the device 500 are connected to the I/O interface 505: an input unit 506 including a keyboard, a mouse, or the like; an output unit 507 including various displays, loudspeakers and the like; the storage unit 508 such as a disk, an optical disk or the like; a communication unit 509 such as a network card, a modem, a wireless communication transceiver or the like. The communication unit 509 allows the device 500 to exchange information/data with other devices through a computer network such as the Internet and/or various telecommunication networks.

The processing unit 501 performs various methods and processing described above, for example, performs the storage management methods 300 and 400. For example, in some embodiments, the method 300 and the method 400 may be implemented as a computer software program, which is stored in a machine-readable medium, for example the storage unit 508. In some embodiments, part or all of the computer program may be loaded into and/or installed on the device 500 via the ROM 502 and/or communication unit 509. When the computer program is loaded to the RAM 503 and executed by the CPU 501, one or more operations of the method 300 and method 400 described above may be performed. Alternatively, in other embodiments, the CPU 501 may be configured in any other proper manners (e.g., by virtue of a firmware) to perform one or more actions of the method 300 and method 400.

Figure 7:
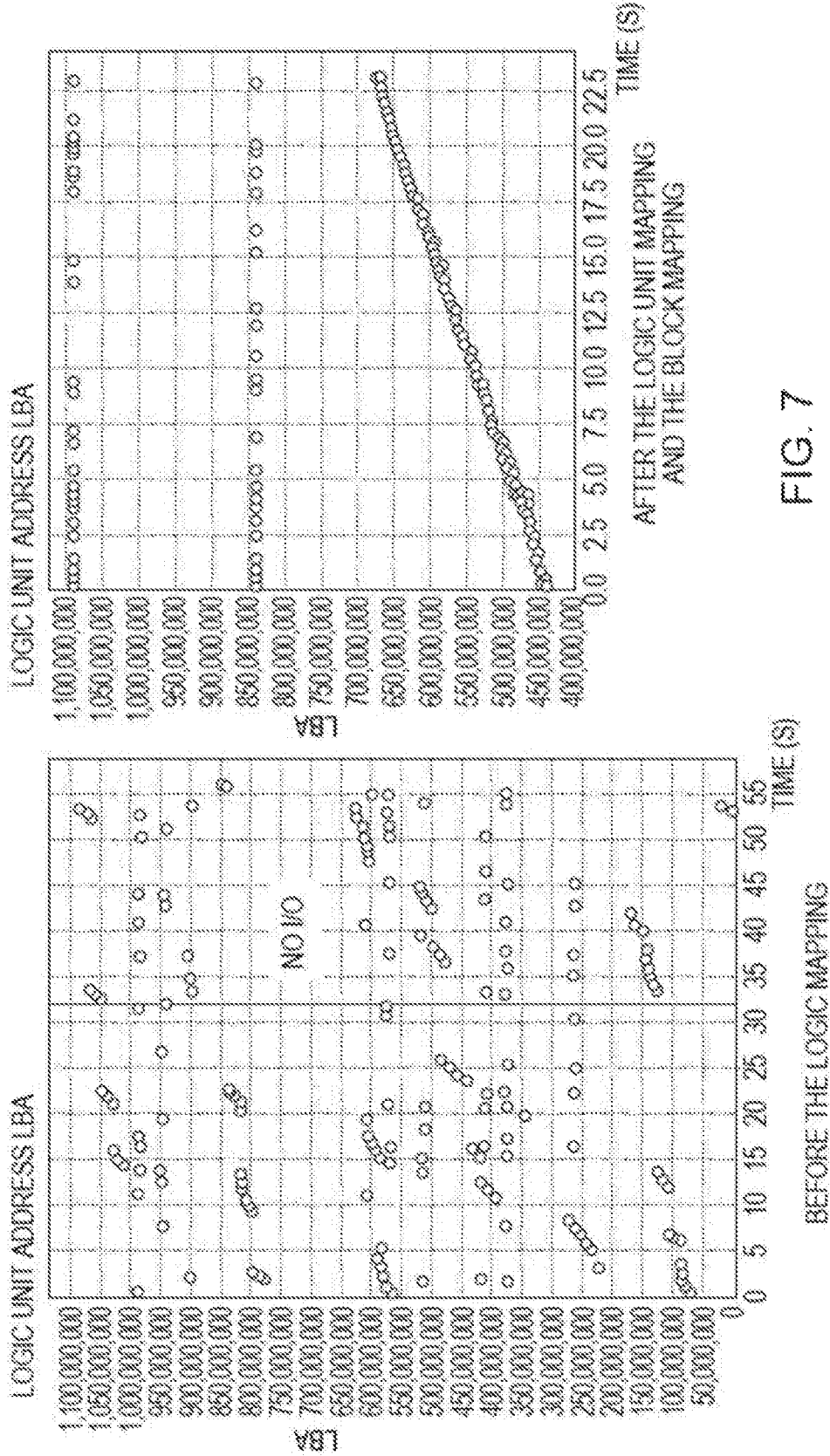
FIG. 7 illustrates a diagram showing contrast of I/O distribution and effect on the disk before and after the storage management method according to an implementation of the subject matter described herein.

FIG. 7 illustrates a diagram showing contrast of I/O effect on the disk before and after the storage management method according to an implementation of the subject matter described herein. A left side of FIG. 7 is a diagram of an I/O effect on the disk by a c conventional storage management method based on simple linear mapping, and a right side of FIG. 7 is a diagram of an I/O effect on the disk by the storage management method according to an implementation of the subject described herein. A longitudinal coordinate of the figure is logic block address, and a transverse coordinate of the figure is time (in second). The I/O on the disk in the I/O effect diagram on the left side is divided to several extents, and the disk does not provide I/O in a time period. The right side represents the I/O effect on the disk by using the storage management method with the logic unit mapping and the block mapping, wherein the I/O on the disk is provided sequentially in all time periods. Hence, as compared with the conventional storage management method based on simple linear mapping, the present disclosure solves the problems such as I/O concentration on partial disk extents and I/O non-sequence by virtue of the logic unit mapping between the logic unit and the RAID extent, and the block mapping between the RAID extent and the disk extent.

To further test the effect of the storage management method, an environment is set on a VNXe array. The environment is specifically: the disk is Hitachi 12 GB SAS, 500 GB. 54 disks. RAID configuration is 5+1, disk extent size is 10 GB, and data block size is 4 MB; the user I/O is: 192 threads, 8K random write. With the conventional linear mapping-based storage management method being used, the corresponding IOPS is measured as about 7500. The corresponding IOPS as measured by using the storage management method based on the logic unit mapping and the block mapping according to an implementation of the subject matter described herein is about 8800. Hence, as compared with 8K random I/O, the performance of the storage management method according to the implementation of the subject matter described herein may improve by about 15%.

It needs to be further appreciated that the present disclosure may be a method, an apparatus, a system and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What are described are only preferred embodiments of the present disclosure, and not intended to limit the present disclosure. Those skilled in the art appreciate that the present disclosure may have various modifications and variations. Any modifications, equivalent substitutes and improvements within the spirit and principles of the present disclosure all fall within the protection scope of the present disclosure.

We claim:

1. A storage management method, comprising:
　　in response to receiving a write request, dividing data to be written into a plurality of data blocks with a predetermined size, the plurality of data blocks having respective logic block addresses;

evenly mapping, based on the logic block addresses, the plurality of data blocks to a plurality of Redundant Array of Independent Disks (RAID) extents of a RAID; and mapping the plurality of data blocks in the plurality of RAID extents to a disk such that the plurality of data blocks are distributed in order of size of the logic block addresses in the disk, wherein determining position information of the plurality of data blocks which are evenly mapped to the plurality of RAID extents comprises:

determining, based on indices of the data blocks in a related logic unit and the number of the RAID extents, position information of the data blocks which are mapped to the RAID extents, and wherein determining position information of the data blocks which are mapped to the RAID extents comprises:

determining, based on remainders obtained by dividing indices by a number of the RAID extents, sequence numbers of the data blocks which are mapped to the RAID extents; and determining, based on quotients obtained by dividing the indices by the number of the RAID extents, internal offsets of the data blocks which are distributed to the RAID extents.

2. The method according to claim 1, wherein a number of data blocks in the RAID is greater than a number of RAID extents in the RAID, such that the data blocks in the logic unit are evenly mapped to all the RAID extents of the RAID.

3. A storage management method, comprising:

in response to receiving a write request, dividing data to be written into a plurality of data blocks with a predetermined size, the plurality of data blocks having respective logic block addresses;

evenly mapping, based on the logic block addresses, the plurality of data blocks to a plurality of Redundant Array of Independent Disks (RAID) extents of a RAID; and mapping the plurality of data blocks in the plurality of RAID extents to a disk such that the plurality of data blocks are distributed in order of size of the logic block addresses in the disk, wherein determining position information of the plurality of data blocks which are mapped to a disk comprises:

determining internal offsets of the data blocks which are mapped to the disk based on a number of disk extents included in the disk, a number of data blocks included in the disk extents and indices of the data blocks in a related logic unit.

4. The method according to claim 3, wherein a number of data blocks in the RAID is greater than a number of RAID extents in the RAID, such that the data blocks in the logic unit are evenly mapped to all the RAID extents of the RAID.

5. A storage management system, comprising:

a storage unit configured to store one or more programs; and a processing unit coupled to the storage unit and configured to execute the one or more programs to cause the system to perform acts comprising:

in response to receiving a write request, dividing data to be written into a plurality of data blocks with a predetermined size, the plurality of data blocks having their respective logic block addresses;

evenly mapping, based on the logic block addresses, the plurality of data blocks to a plurality of Redundant Array of Independent Disks (RAID) extents of a RAID; and mapping the plurality of data blocks in the plurality of RAID extents to a disk such that the plurality of data blocks are distributed in order of size of the logic block addresses in the disk, wherein determining position information of the plurality of data blocks which are evenly mapped to the plurality of RAID extents comprises:

determining, based on indices of the data blocks in a related logic unit and the number of the RAID extents, position information of the data blocks which are mapped to the RAID extent, and wherein determining position information of the data blocks which are mapped to the RAID extents comprises:

determining, based on remainders obtained by dividing indices by a number of the RAID extents, sequence numbers of the data blocks which are mapped to the RAID extents; and determining, based on quotients obtained by dividing the indices by the number of the RAID extents, internal offsets of the data blocks which are distributed to the RAID extents.

6. The system according to claim 5, wherein a number of data blocks in the RAID is greater than a number of RAID extents in the RAID, such that the data blocks in the logic unit are evenly mapped to all the RAID extents of the RAID.

7. A storage management system, comprising:

a storage unit configured to store one or more programs; and a processing unit coupled to the storage unit and configured to execute the one or more programs to cause the system to perform acts comprising:

in response to receiving a write request, dividing data to be written into a plurality of data blocks with a predetermined size, the plurality of data blocks having their respective logic block addresses;

evenly mapping, based on the logic block addresses, the plurality of data blocks to a plurality of Redundant Array of Independent Disks (RAID) extents of a RAID; and mapping the plurality of data blocks in the plurality of RAID extents to a disk such that the plurality of data blocks are distributed in order of size of the logic block addresses in the disk, wherein determining position information of the plurality of data blocks which are mapped to a disk comprises:

determining internal offsets of the data blocks which are mapped to the disk based on a number of disk extents included in the disk, a number of data blocks included in the disk extents and indices of the data blocks in a related logic unit.

8. The system according to claim 7, wherein a number of data blocks in the RAID is greater than a number of RAID extents in the RAID, such that the data blocks in the logic unit are evenly mapped to all the RAID extents of the RAID.

9. A computer program product for storage management, the computer program product comprising: a non-transitory computer readable medium encoded with computer-executable code, the code configured for the execution of:

in response to receiving a write request, dividing data to be written into a plurality of data blocks with a predetermined size, the plurality of data blocks having respective logic block addresses;

evenly mapping, based on the logic block addresses, the plurality of data blocks to a plurality of Redundant Array of Independent Disks (RAID) extents of a RAID; and mapping the plurality of data blocks in the plurality of RAID extents to a disk such that the plurality of data blocks are distributed in order of size of the logic block addresses in the disk;

wherein determining position information of the plurality of data blocks which are evenly mapped to the plurality of RAID extents comprises:

determining, based on indices of the data blocks in a related logic unit and the number of the RAID extents, position information of the data blocks which are mapped to the RAID extents; and wherein determining position information of the data blocks which are mapped to the RAID extents comprises:

determining, based on remainders obtained by dividing indices by a number of the RAID extents, sequence numbers of the data blocks which are mapped to the RAID extents; and determining, based on quotients obtained by dividing the indices by the number of the RAID extents, internal offsets of the data blocks which are distributed to the RAID extents.

10. The computer program product of claim 9, wherein a number of data blocks in the RAID is greater than a number of RAID extents in the RAID, such that the data blocks in the logic unit are evenly mapped to all the RAID extents of the RAID.

11. A computer program product for storage management, the computer program product comprising: a non-transitory computer readable medium encoded with computer-executable code, the code configured for the execution of:

in response to receiving a write request, dividing data to be written into a plurality of data blocks with a predetermined size, the plurality of data blocks having respective logic block addresses;

evenly mapping, based on the logic block addresses, the plurality of data blocks to a plurality of Redundant Array of Independent Disks (RAID) extents of a RAID; and mapping the plurality of data blocks in the plurality of RAID extents to a disk such that the plurality of data blocks are distributed in order of size of the logic block addresses in the disk, wherein determining position information of the plurality of data blocks which are mapped to a disk comprises:

determining internal offsets of the data blocks which are mapped to the disk based on a number of disk extents included in the disk, a number of data blocks included in the disk extents and indices of the data blocks in a related logic unit.

12. The computer program product of claim 11, wherein a number of data blocks in the RAID is greater than a number of RAID extents in the RAID, such that the data blocks in the logic unit are evenly mapped to all the RAID extents of the RAID.

* * * * *